US007836032B2

(12) United States Patent
Morgan

(10) Patent No.: US 7,836,032 B2
(45) Date of Patent: Nov. 16, 2010

(54) REMAPPING CHILD REFERENCES WHEN PARENT REFERENCE UPDATES ARE PROCESSED

(75) Inventor: Timothy S. Morgan, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 11/390,782

(22) Filed: Mar. 28, 2006

(65) Prior Publication Data

US 2007/0239807 A1 Oct. 11, 2007

(51) Int. Cl.
*G06F 7/00* (2006.01)
(52) U.S. Cl. ........................... 707/702; 707/790
(58) Field of Classification Search ............... 707/1–6, 707/100–102, 206
See application file for complete search history.

(56) References Cited

U.S. PATENT DOCUMENTS

| 5,603,204 | A  | * | 2/1997  | Harvey-Rioux et al. ........... 56/9 |
| 5,765,159 | A  | * | 6/1998  | Srinivasan ................... 707/102 |
| 5,787,433 | A  | * | 7/1998  | Plotkin et al. ................ 707/101 |
| 6,108,664 | A  | * | 8/2000  | Nori et al. ................ 707/103 R |
| 6,564,203 | B1 | * | 5/2003  | Krishnaprasad et al. ......... 707/2 |
| 6,571,231 | B2 | * | 5/2003  | Sedlar ............................ 707/1 |
| 6,691,176 | B1 |   | 2/2004  | Narin et al. |
| 6,763,358 | B2 | * | 7/2004  | Anderson et al. ........... 707/102 |
| 6,823,334 | B2 | * | 11/2004 | Vishnubhotla et al. ......... 707/5 |
| 6,839,716 | B1 | * | 1/2005  | Della-Libera et al. ... 707/103 R |
| 7,003,504 | B1 | * | 2/2006  | Angus et al. .................... 707/1 |
| 7,162,469 | B2 | * | 1/2007  | Anonsen et al. ................. 707/3 |
| 7,177,875 | B2 | * | 2/2007  | Howard et al. .............. 707/100 |
| 7,257,597 | B1 | * | 8/2007  | Pryce et al. ................. 707/102 |
| 7,383,314 | B1 | * | 6/2008  | Yoon et al. .................. 709/217 |
| 2002/0194149 | A1 | * | 12/2002 | Gerber et al. ................... 707/1 |
| 2002/0194155 | A1 | * | 12/2002 | Aldridge et al. ................ 707/1 |
| 2004/0093344 | A1 | * | 5/2004  | Berger et al. ................ 707/102 |
| 2004/0186860 | A1 |   | 9/2004  | Lee et al. |
| 2005/0086220 | A1 |   | 4/2005  | Coker et al. |
| 2005/0091098 | A1 |   | 4/2005  | Brodersen et al. |
| 2005/0114763 | A1 |   | 5/2005  | Nonomura et al. |
| 2005/0138160 | A1 |   | 6/2005  | Klein et al. |
| 2005/0146447 | A1 |   | 7/2005  | Na |
| 2005/0165733 | A1 |   | 7/2005  | Strovink |
| 2005/0179684 | A1 |   | 8/2005  | Wallace |
| 2005/0228803 | A1 |   | 10/2005 | Farmer et al. |
| 2005/0289114 | A1 | * | 12/2005 | Bellamy ........................ 707/2 |
| 2006/0011720 | A1 | * | 1/2006  | Call ............................ 235/383 |
| 2006/0190814 | A1 | * | 8/2006  | Collie et al. ................ 715/513 |
| 2006/0212496 | A1 | * | 9/2006  | Romine et al. ............. 707/204 |

(Continued)

*Primary Examiner*—Etienne P LeRoux
*Assistant Examiner*—Jessica N Le
(74) *Attorney, Agent, or Firm*—Dillon & Yudell LLP

(57) ABSTRACT

The present invention presents a method, system and computer-implementable medium for remapping child references when parent reference updates are processed. The method includes the steps of creating a table that is used to store List Of Value (LOV) reference updates that need to be processed for remapping; creating triggers to populate the table dynamically as the LOV reference updates occur; extracting object mapping definitions from a definition repository; storing extracted object mapping definitions into a control table in memory; capturing LOV reference updates dynamically as they occur and populating the updates in the table via the triggers; matching the extracted object mapping definitions with the LOV reference updates; and remapping child references of parent LOV data using matched object mapping definitions

8 Claims, 14 Drawing Sheets

U.S. PATENT DOCUMENTS

| | | |
|---|---|---|
| 2006/0224613 A1* | 10/2006 | Bermender et al. ......... 707/102 |
| 2006/0235903 A1* | 10/2006 | Kapur ....................... 707/202 |
| 2006/0259470 A1* | 11/2006 | Chandrasekharan et al. ... 707/3 |
| 2006/0265410 A1* | 11/2006 | Christianson et al. ....... 707/100 |
| 2007/0005632 A1* | 1/2007 | Stefani et al. ............... 707/102 |
| 2007/0112834 A1* | 5/2007 | Farr et al. ................... 707/102 |
| 2007/0220022 A1* | 9/2007 | Lankinen et al. ............ 707/101 |
| 2007/0226155 A1* | 9/2007 | Yu et al. ..................... 705/400 |
| 2007/0226171 A1* | 9/2007 | Medicke et al. ................ 707/1 |
| 2008/0281849 A1* | 11/2008 | Mineno ..................... 707/101 |

* cited by examiner

| BUSCOMP | FIELD | TABLE | COLUMN | LOV_TYPE | LOV_TABLE | LOV_COL |
|---|---|---|---|---|---|---|
| ACCOUNT | ACCOUNT ROLE | S_OPTY_ORG | OPTY_OU_ROLE_CD | ACCOUNT_ROLE | S_LST_OF_VAL | VAL |
| ACCOUNT | ACCOUNT STATUS | S_ORG_EXT | CUST_STAT_CD | ACCOUNT_STATUS | S_LST_OF_VAL | NAME |
| ACCOUNT | TYPE | S_ORG_EXT | OU_TYPE_CD | ACCOUNT_TYPE | S_LST_OF_VAL | NAME |
| CONTACT | INDUSTRY | S_CONTACT_X | ATTRIB_48 | INDUSTRY | S_LST_OF_VAL | VAL |
| CONTACT | M/F | S_CONTACT | SEX_MF | SEX_MF | S_LST_OF_VAL | VAL |
| CONTACT | ROLE | S_OPTY_CON | ROLE_CD | CONTACT_ROLE | S_LST_OF_VAL | NAME |
| CONTACT | STATUS | S_CONTACT | CUST_STAT_CD | CONTACT_STATUS | S_LST_OF_VAL | VAL |
| OPPORTUNITY | CHANNEL | S_OPTY | CHANNEL_TYPE_CD | OPTY_CHANNEL_TYPE | S_LST_OF_VAL | NAME |
| OPPORTUNITY | ORG STATUS | S_OPTY_CON | ORG_STAT_CD | TAS_ORG_STATUS | S_LST_OF_VAL | VAL |
| OPPORTUNITY | QUALITY | S_OPTY | LEAD_QUALITY_CD | LEAD_QUALITY | S_LST_OF_VAL | VAL |
| OPPORTUNITY | STATUS | S_OPTY | STATUS_CD | OPTY_STATUS | S_LST_OF_VAL | VAL |

FIG. 2A

| ROW_ID | TYPE | COL | PRE_VAL | POST_VAL | CREATED | PROCESS_DT |
|---|---|---|---|---|---|---|
| NAMEA2005-05-25-00.44.25.291775 | ACCOUNT_STATUS | NAME | I | A | 2005-05-25-00.44.25.291775 | |

FIG. 2B

REMAPPING CHILD REFERENCES WHEN PARENT REFERENCE UPDATES ARE PROCESSED

BACKGROUND OF THE INVENTION

1. Technical Field

The present invention relates in general to the field of computers and similar technology systems, and in particular to software utilized by such systems to implement methods and processes. Still more particularly, the present invention relates to a computer-implementable method and system for remapping child references when parent updates in a Siebel CRM environment are processed.

2. Description of the Related Art

Siebel Systems® provides many software products, including a Customer Relationship Management (CRM) system ("Siebel CRM"). Siebel CRM is a useful software package for tracking and managing product orders, shipping, sales opportunities, etc. Included in the Siebel CRM system is a List Of Values (LOV), which is a common set of references that describe data objects. For example, an LOV reference may be for the status of an object, which may be open, closed, or active. As shown in FIG. 1, such status statements are kept in an LOV parent table 102 as an LOV reference 104. Each child table 106 may utilize the current status of the LOV reference 104.

A problem arises when an LOV reference 104 in the LOV parent table 102 changes. This presents the challenge of remapping child List Of Values (LOV) references in user child tables 106 when parent LOV updates are processed in the Siebel Enterprise. Currently, there are no Siebel or Original Equipment Manufacturer (OEM) products available to utilize the specific object definitions of a Siebel instance to remap LOV references when LOV data is modified. Some Siebel customers may require frequent LOV updates, which would deem this solution critical in maintaining a complete and accurate set of customer information.

SUMMARY OF THE INVENTION

Recognizing the need for a method for managing LOV updates, the present invention presents a method, system and computer-implementable medium for remapping child references when parent reference updates are processed. The method includes the steps of creating a table that is used to store List Of Value (LOV) reference updates that need to be processed for remapping; creating triggers to populate the table dynamically as the LOV reference updates occur; extracting object mapping definitions from a definition repository; storing extracted object mapping definitions into a control table in memory; capturing LOV reference updates dynamically as they occur and populating the updates in the table via the triggers; matching the extracted object mapping definitions with the LOV reference updates; and remapping child references of parent LOV data using matched object mapping definitions.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 2a-c depict components of the inventive architecture that dynamically updates LOV references in LOV children;

DETAILED DESCRIPTION OF THE PREFERRED EMBODIMENT

Figure 1:
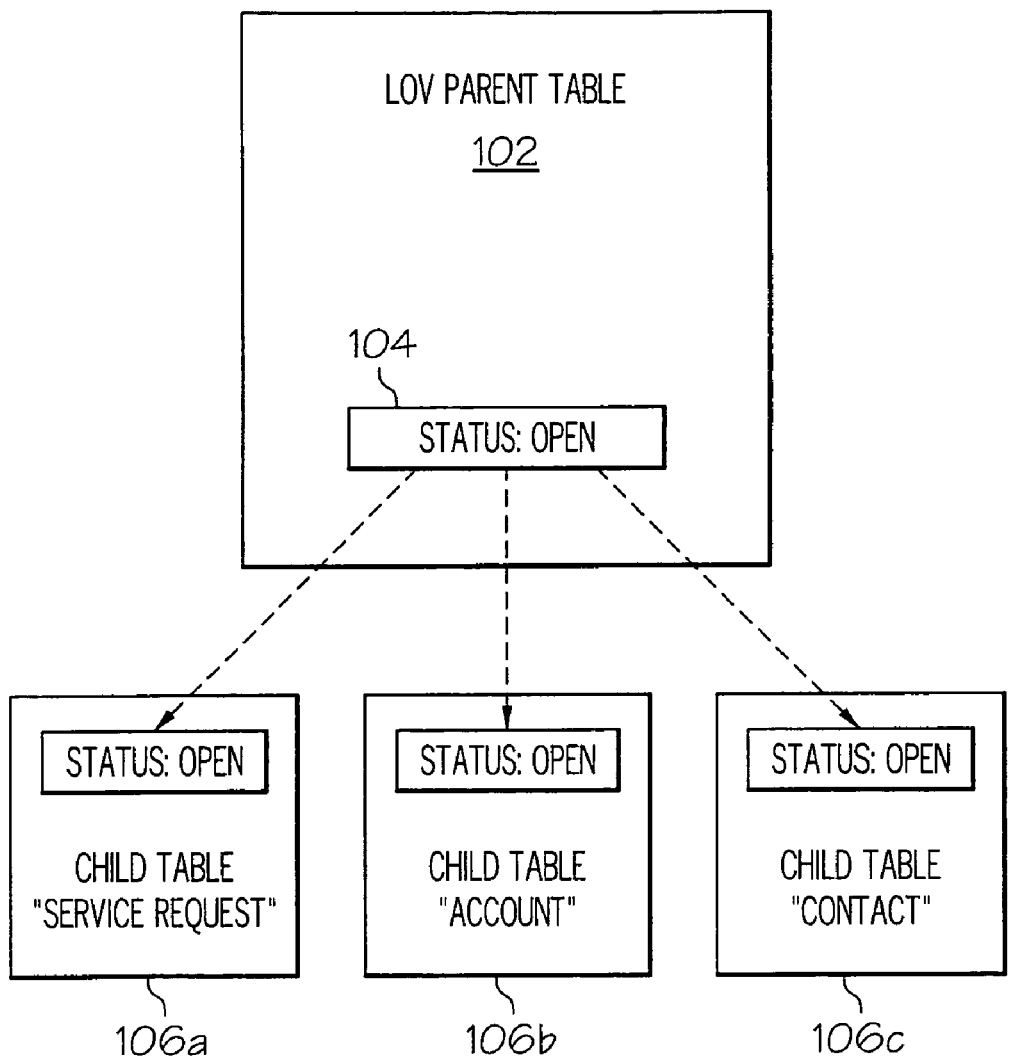
FIGS. 1 shows a prior art architecture of a Siebel® CRM framework.

The present invention provides a method and system for remapping child LOV references when parent LOV updates are processed in a Siebel® Enterprise. A function is provided to remap child LOV references for modified parent LOV data based on the specific object configuration of a particular Siebel® instance. The solution provides Data Definition Language (DDL) script to create a new table and new triggers, plus script to extract LOV mappings and processing logic to remap occurrences of specific updated LOV items.

Object mapping definitions are extracted from the Siebel® repository and stored into memory. This information includes child table and column information, the LOV type for each, along with the matching LOV column. This column will be NAME if the child column is configured as a Multi-language LOV (MLOV) or VAL if a regular LOV.

These child definitions are matched with specific LOV updates which are captured in a new table via update triggers. This new table is called CX_LST_OF_VAL_UPD and is used to store information about the specific LOV update, including, the column updated (NAME or VAL), the LOV type for the LOV record and the specific pre and post values.

All documented script is database specific for a Unicode enabled DB2 database, however, it can be modified, if necessary, to accommodate Microsoft SQL Server or Oracle as the logic would be consistent.

A. Installation

An installation step is required to create a table used to store LOV updates that need to be processed for remapping. This table will hold the LOV Column, which was updated, as well, as the value before and after the update. This table will also contain several internal system columns. Exemplary DDL script used to create this table is included below:

--- drop table siebel.CX_LST_OF_VAL_UPD;
create table siebel.CX_LST_OF_VAL_UPD (row_id vargraphic (100), type vargraphic (50), col vargraphic (50), pre_val vargraphic (50), post_val vargraphic (50), created timestamp, process_dt timestamp)

-continued

```
in SIEBEL_4K index in SIEBEL_4K;
create unique index siebel.CX_LST_OF_VAL_UPD_1 on
siebel.CX_LST_OF_VAL_UPD
(row_id asc) pctfree 30 allow reverse scans;
```

An additional installation step is required to create triggers to populate this new table dynamically as updates occur. These triggers will queue up records to be processed when updates occur to the NAME or VAL columns in the S_LST_OF_VAL table. The trigger DDL is included in the following exemplary code:

```
SET SCHEMA SIEBEL;
SET CURRENT PATH = "SYSIBM","SYSFUN","SYSPROC","SIEBEL";
CREATE TRIGGER SIEBEL.S_LST_OF_VAL_U1_REMAP
    AFTER
    UPDATE
    ON SIEBEL.S_LST_OF_VAL
    REFERENCING
        OLD AS pre
        NEW AS post
    FOR EACH ROW
    MODE DB2SQL
    WHEN ((pre.NAME IS NOT NULL AND post.NAME IS NULL) OR
          (post.NAME <> pre.NAME))
        BEGIN ATOMIC
    insert into siebel.CX_LST_OF_VAL_UPD (ROW_ID, TYPE, COL, PRE_VAL, POST_VAL,
CREATED)
        values ('NAME' || post.NAME || char(current timestamp),
                post.TYPE, 'NAME', pre.NAME, post.NAME, Current Timestamp);
END;
CREATE TRIGGER SIEBEL.S_LST_OF_VAL_U2_REMAP
    AFTER
    UPDATE
    ON SIEBEL.S_LST_OF_VAL
    REFERENCING
        OLD AS pre
        NEW AS post
    FOR EACH ROW
    MODE DB2SQL
    WHEN ((pre.VAL IS NOT NULL AND post.VAL IS NULL) OR
          (post. VAL <> pre.VAL))
        BEGIN ATOMIC
    insert into siebel.CX_LST_OF_VAL_UPD (ROW_ID, TYPE, COL, PRE_VAL, POST_VAL,
CREATED)
        values ('VAL' || post.VAL || char(current timestamp),
                post.TYPE, 'VAL', pre.VAL, post.VAL, Current Timestamp);
END;
```

B. Processing

LOV remappings will be processed in a specific order utilizing script documented in this section.

Step 1—Read Object Mappings into Memory

The following exemplary script will be used to load child LOV mapping information into memory. This information will be used to define the child columns and relevant parent LOV mapping columns required for remapping for parent occurrences indicated in the CX_LST_OF_VAL_UPD table.

```
select a.name buscomp, b.name field,
CASE WHEN b.join_name is not null THEN b.join_name ELSE
a.table_name END as table,
b.col_name column, c.type_value lov_type, d.table_name lov_table,
CASE WHEN f.trans_table_id is not null THEN 'NAME' ELSE 'VAL'
END as lov_col
from siebel.s_buscomp a, siebel.s_field b, siebel.s_picklist c,
```

-continued

```
siebel.s_buscomp d,
siebel.s_table e, siebel.s_column f, siebel.s_repository rep
where a.row_id = b.buscomp_id
and b.picklist_name = c.name
and c.buscomp_name = d.name
and CASE WHEN b.join_name is not null THEN b.join_name
ELSE a.table_name END =
e.name
and (e.row_id = f.tbl_id and b.col_name = f.name)
and (b.join_name is null or (b.join_name not in (select j.name
from siebel.s_join j where
                        a.row_id=j.buscomp_id)))
```

-continued

```
and (a.repository_id = rep.row_id
and b.repository_id = rep.row_id
and c.repository_id = rep.row_id
and d.repository_id = rep.row_id
and e.repository_id = rep.row_id
and e.repository_id = rep.row_id
and rep.name = 'Siebel Repository')
and d.table_name = 'S_LST_OF_VAL'
and b.multi_valued <> 'Y'
and a.inactive_flg <> 'Y'
and b.inactive_flg <> 'Y'
and a.name in ('Account', 'Contact', 'Opportunity', 'Service Request')
```

The object list included in the last line of this script are specific Siebel Business Components and are defined manually per the specific Siebel instance used.

Step 2—Process Child LOV Mappings

FIG. 2a contains an example diagram of the output from the script in Step 1.

FIG. 2b contains an example diagram of the CX_LST_OF_VAL_UPD table, with a record populated via the first trigger in Step 1.

With reference to FIG. 2b, which represents data in a parent LOV table, notice that the Pre-change (PRE_VAL) value for LOV type "ACCOUNT_STATUS" was "I" (Inactive), and the Post-change (POST_VAL) value for "NAME" is "A" (Active). When this change is made, then the reference for "ACCOUNT_STATUS" in the child LOV table shown in FIG. 2a will be changed from "Inactive" to "Active," via the methodology described herein.

Processing Logic

LOV child remappings are processing is controlled by the records in the CX_LST_OF_VAL_UPD table as defined in Diagram B. Processing steps are included below for a single row in CX_LST_OF_VAL_UPD. Processing steps should be continued until all candidate rows from this table are processed.

1. Retrieve child columns from LOV Object Mappings (Diagram A) which are mapped to parent table defined in the CX_LST_OF_VAL_UPD table (Diagram B). Child mappings are matched by CX_LST_OF_VAL_UPD.TYPE=Mappings.LOV_TYPE and
CX_LST_OF_VAL_UPD.COL=Mappings.LOV_COL
where PROCESS_DT in the CX_LST_OF_VAL_UPD table is null.
2. Remap all occurrences of PRE_VAL with POST_VAL from Diagram B in TABLE and COLUMN defined in Diagram A.
3. Continue processing for all relevant mappings from Diagram A.
4. Mark CX_LST_OF_VAL_UPD row as complete by setting PROCESS_DT to Current Timestamp.

Maintenance

The CX_LST_OF_VAL_UPD table may be archived and truncated as necessary.

There is no maintenance required for the LOV Object mappings as these are retrieved from the Siebel repository each time the process is invoked. This dictates that mappings do not need to be reevaluated as Siebel object definitions change.

Candidate Siebel objects which contain LOV columns for remapping will need to be maintained for the specific Siebel enterprise. Otherwise, all Siebel repository objects will be evaluated. This could significantly increase the time needed to process each CX_LST_OF_VAL_UPD row. The list of candidate objects are contained in the script documented in Processing Step 1.

Figure 2C:
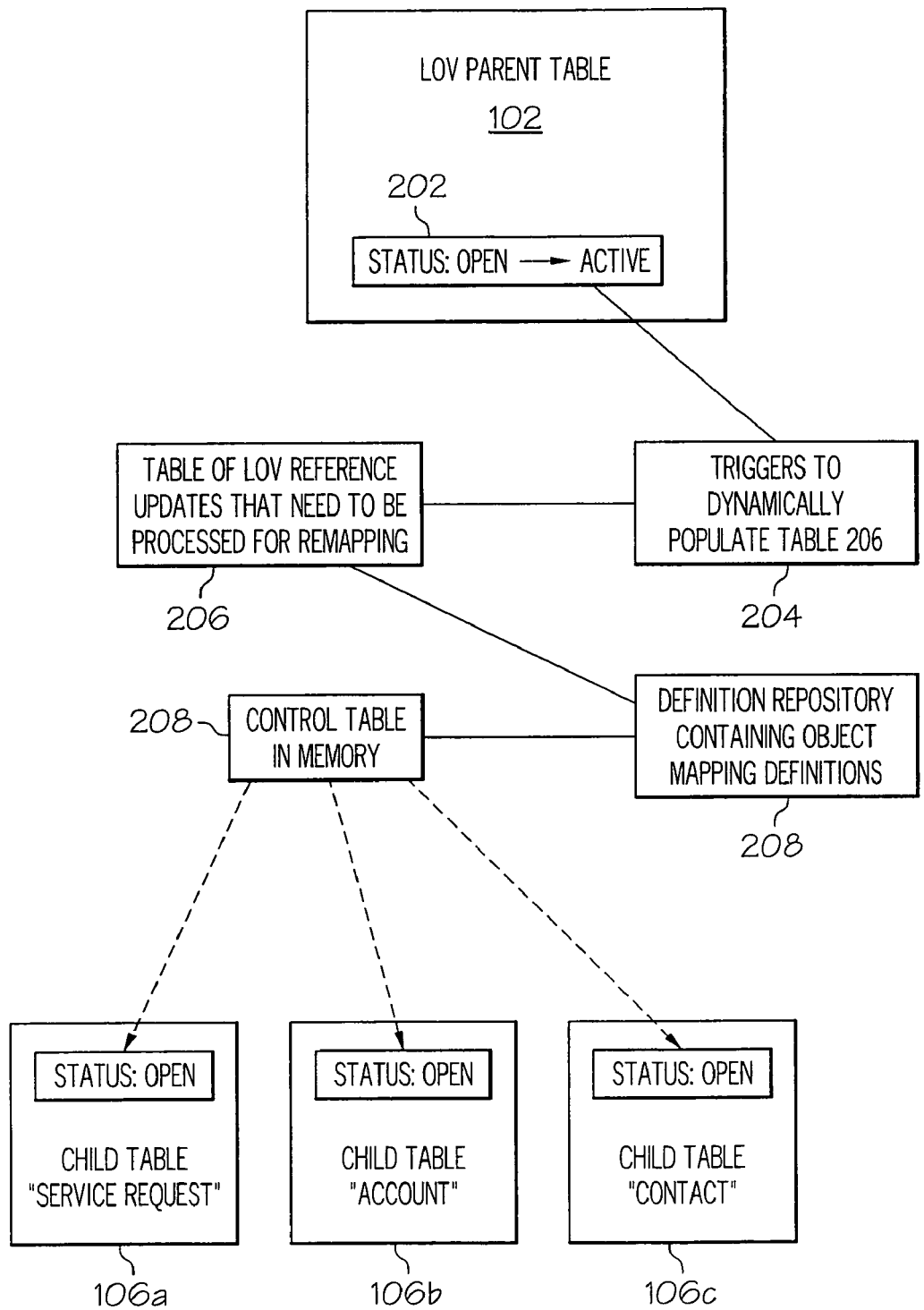

With reference now to FIG. 2c, an exemplary architectural overview and process review of the present invention is presented. As depicted, within LOV parent table 102 is an LOV reference 202, which for exemplary purposes describes an object status changing from "Open" to "Active." This change causes triggers 204 to dynamically populate a table 206 of LOV reference dynamically as LOV reference updates occur, which need to be processed for remapping. Table 206 is used to extract object mapping definitions from definition repository 208. These extracted object mapping definitions are stored in control table 208 in memory. Using the described components, LOV reference updates are dynamically captured as they occur, and the LOV reference updates are populated into the control table 208. As described above, when extracted object mapping definitions (see FIG. 2a) match with LOV reference updates (see FIG. 2b), child references of parent LOV data are remapped using the matched object mapping definitions. Note that each trigger preferably causes only one LOV reference update to populate the table (i.e., LOV reference updates occur one at a time). Note also, that as the preferred embodiment is performed within a Siebel Enterprise environment, remapping child LOV references for modified parent LOV data is based on a specific object configuration of a particular Siebel instance.

Figure 3:
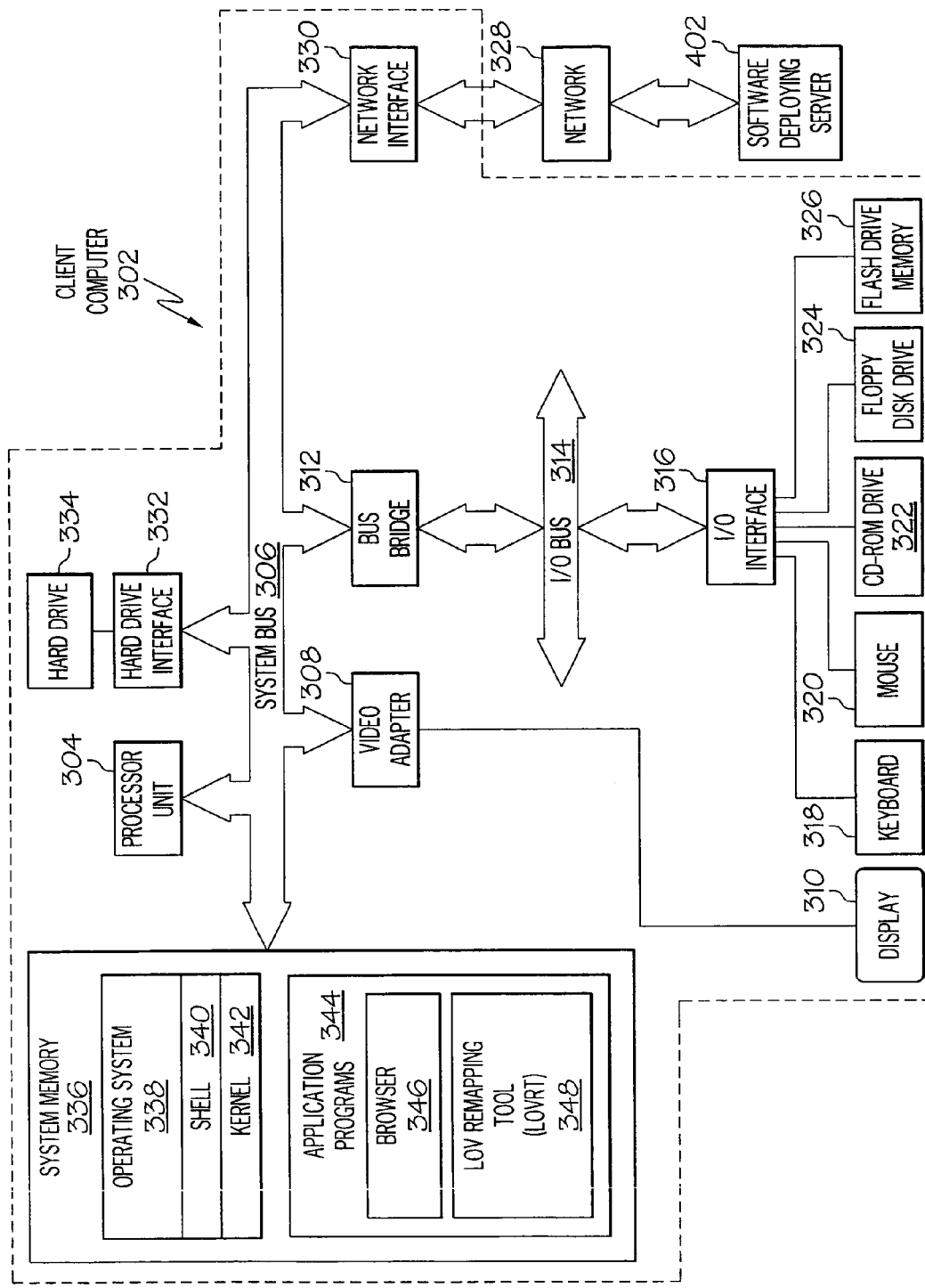
FIG. 3 illustrates an exemplary computer in which the present invention may implemented.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a service provider server 402 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®, also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with service provider server 402.

Application programs 344 in client computer 302's system memory also include a LOV Remapping Tool (LOVRT) 348. LOVRT 348 includes code for implementing the processes described in FIGS. 2a-c. In one embodiment, client computer 302 is able to download LOVRT 348 from service provider server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
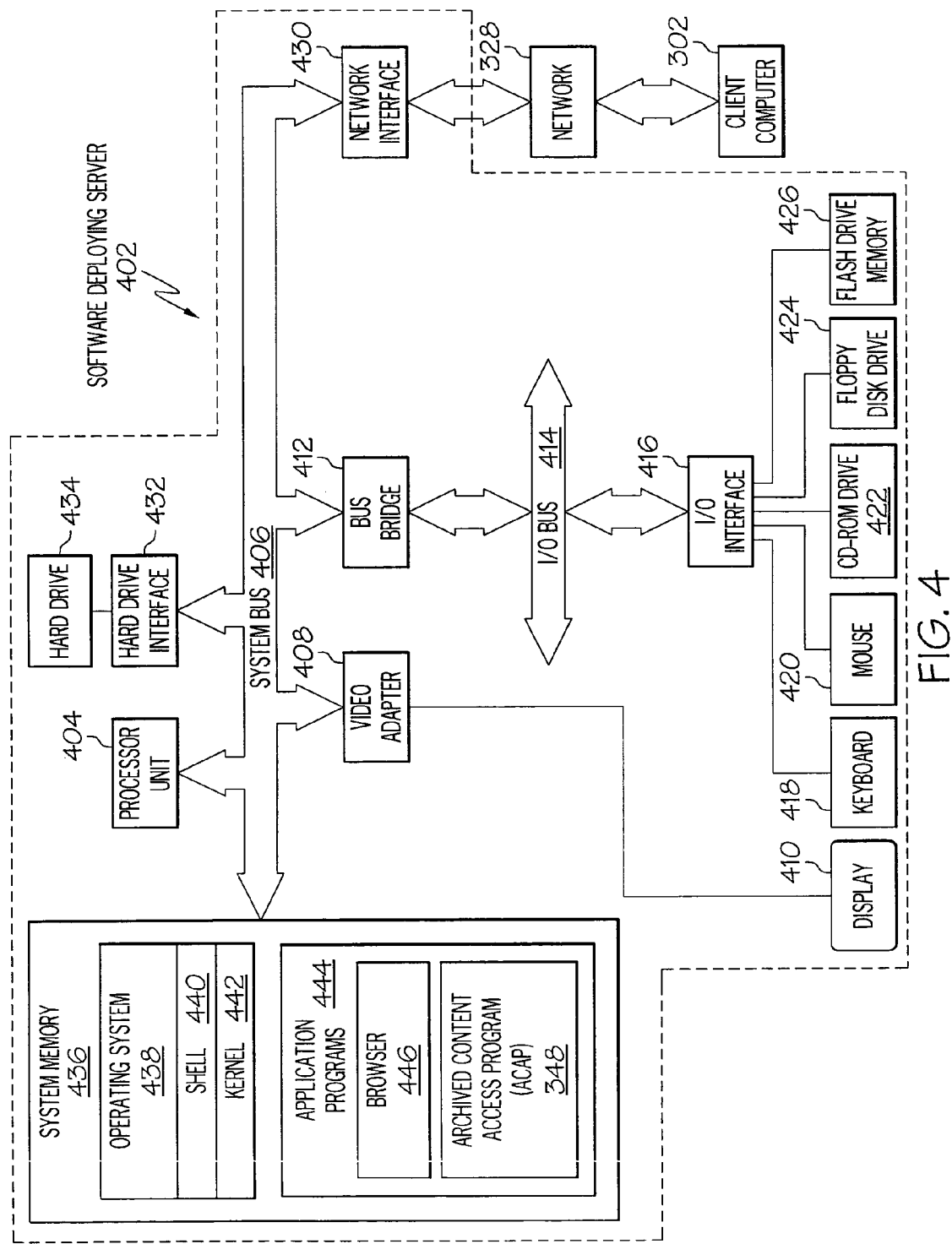
FIG. 4 depicts an exemplary server from which software for executing the present invention may be deployed.

As noted above, LOVRT 348 can be downloaded to client computer 302 from service provider server 402, shown in exemplary form in FIG. 4. Service provider server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Service provider server 402 is able to communicate with client computer 302 via network 328 using a network interface 430, which is coupled to system bus 406. Access to network 328 allows service provider server 402 to deploy LOVRT 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes service provider server 402's operating system 438, which includes a shell 440 and a kernel 442. Shell 440 is incorporated in a higher level operating system layer and utilized for providing transparent user access to resources such as application programs 444, which include a browser 446, and a copy of LOVRT 348 described above, which can be deployed to client computer 302.

The hardware elements depicted in service provider server 402 are not intended to be exhaustive, but rather are representative to highlight essential components required by the present invention. For instance, service provider server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 402 performs all of the functions associated with the present invention (including execution of LOVRT 348), thus freeing client computer 302 from having to use its own internal computing resources to execute LOVRT 348.

It should be understood that at least some aspects of the present invention may be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the process described by the present invention, including the functions of LOVRT. 348, is performed by service provider server 402. Alternatively, LOVRT 348 and the method described herein, and in particular as shown and described in FIGS. 2a-c, can be deployed as a process software from service provider server 402 to client computer 302. Still more particularly, process software for the method so described may be deployed to service provider server 402 by another service provider server (not shown).

Figure 5A:
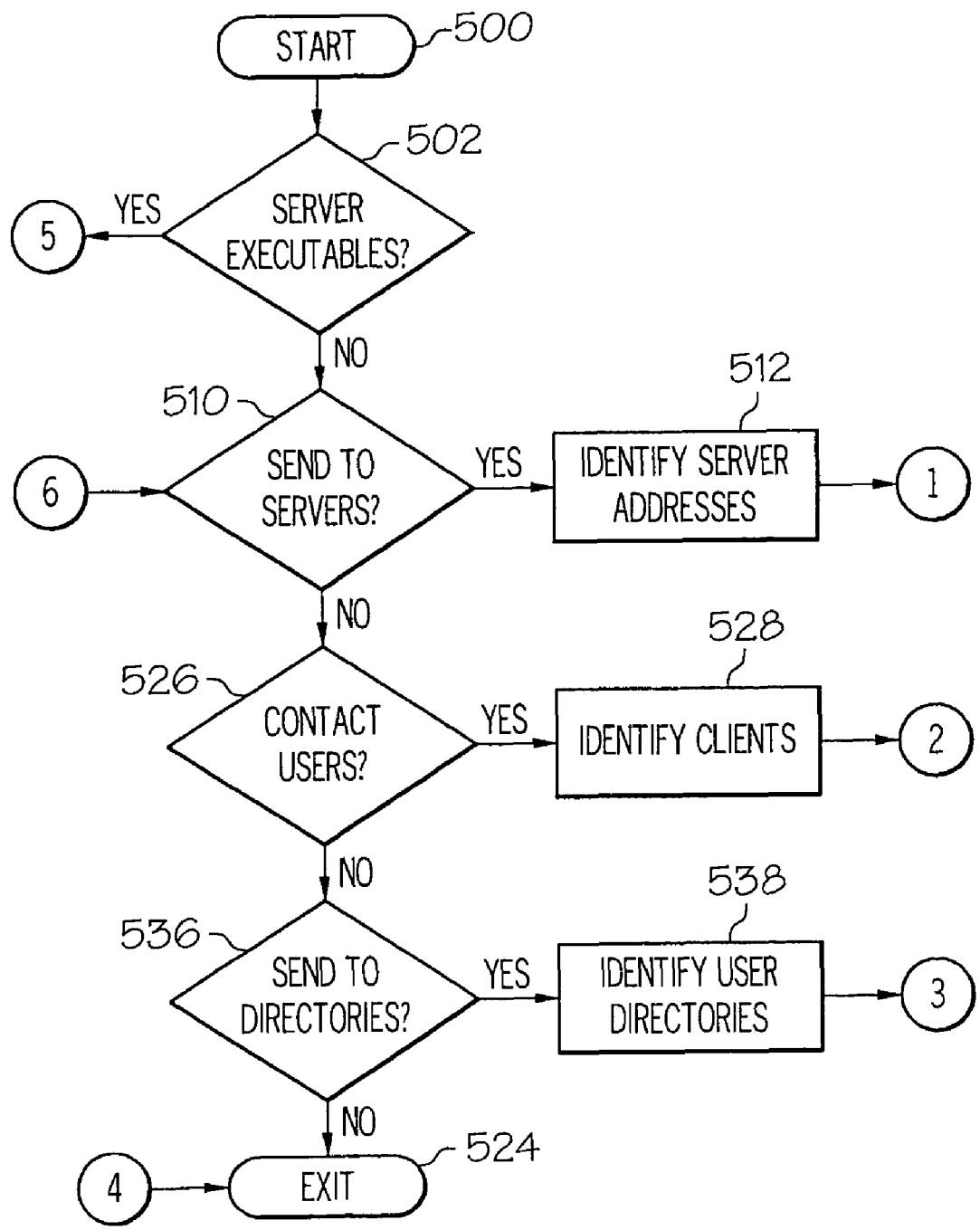
FIGS. 5a-b show a flow-chart of steps taken to deploy software capable of executing the steps shown and described in FIGS. 2a-c.
Figure 5B:
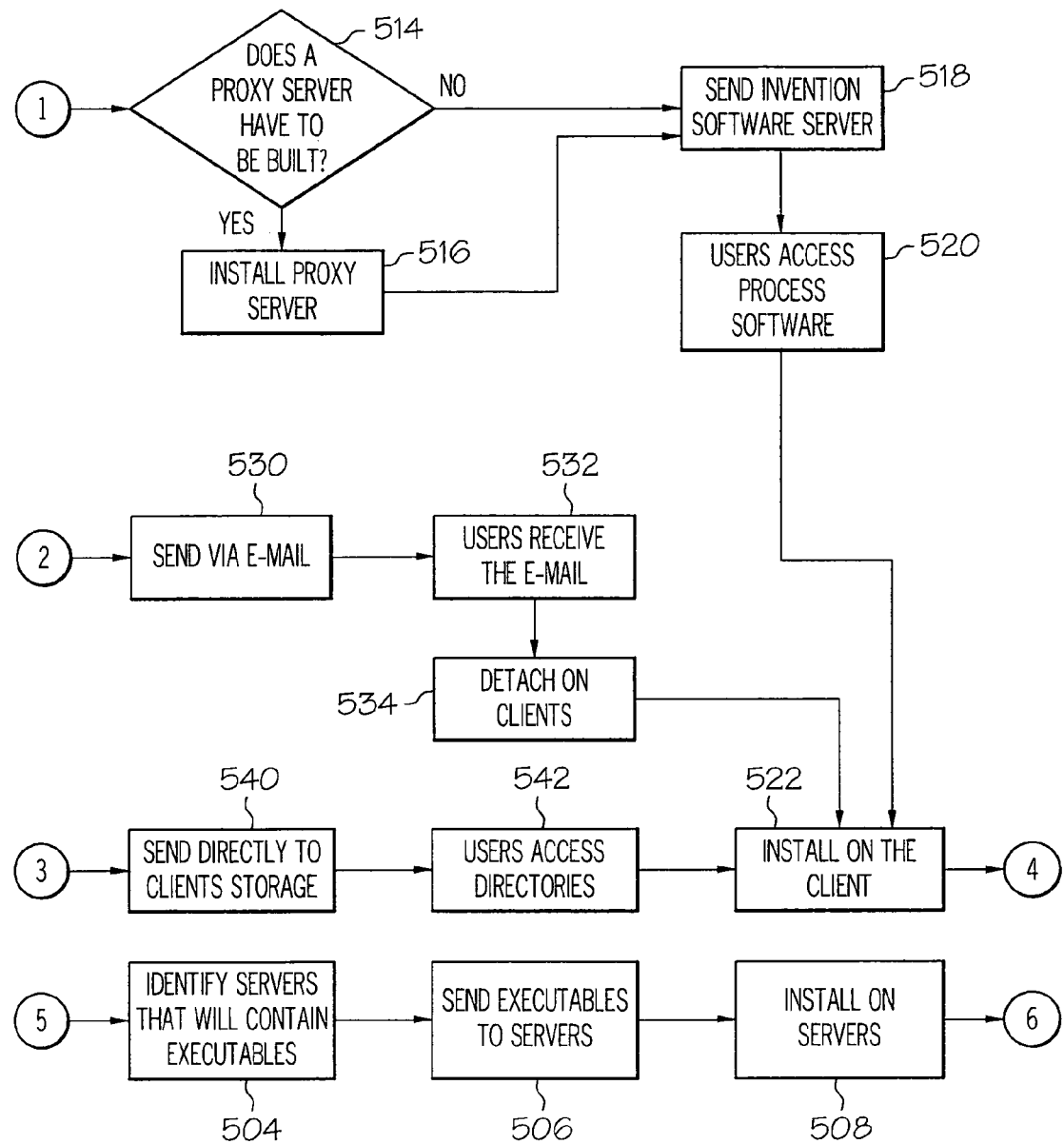

Referring then to FIG. 5, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made on whether to the process software will be sent directly to user directories on their client computers (query block 536). If so, the user directories are identified (block 538). The process software is transferred directly to the user's client computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 6A:
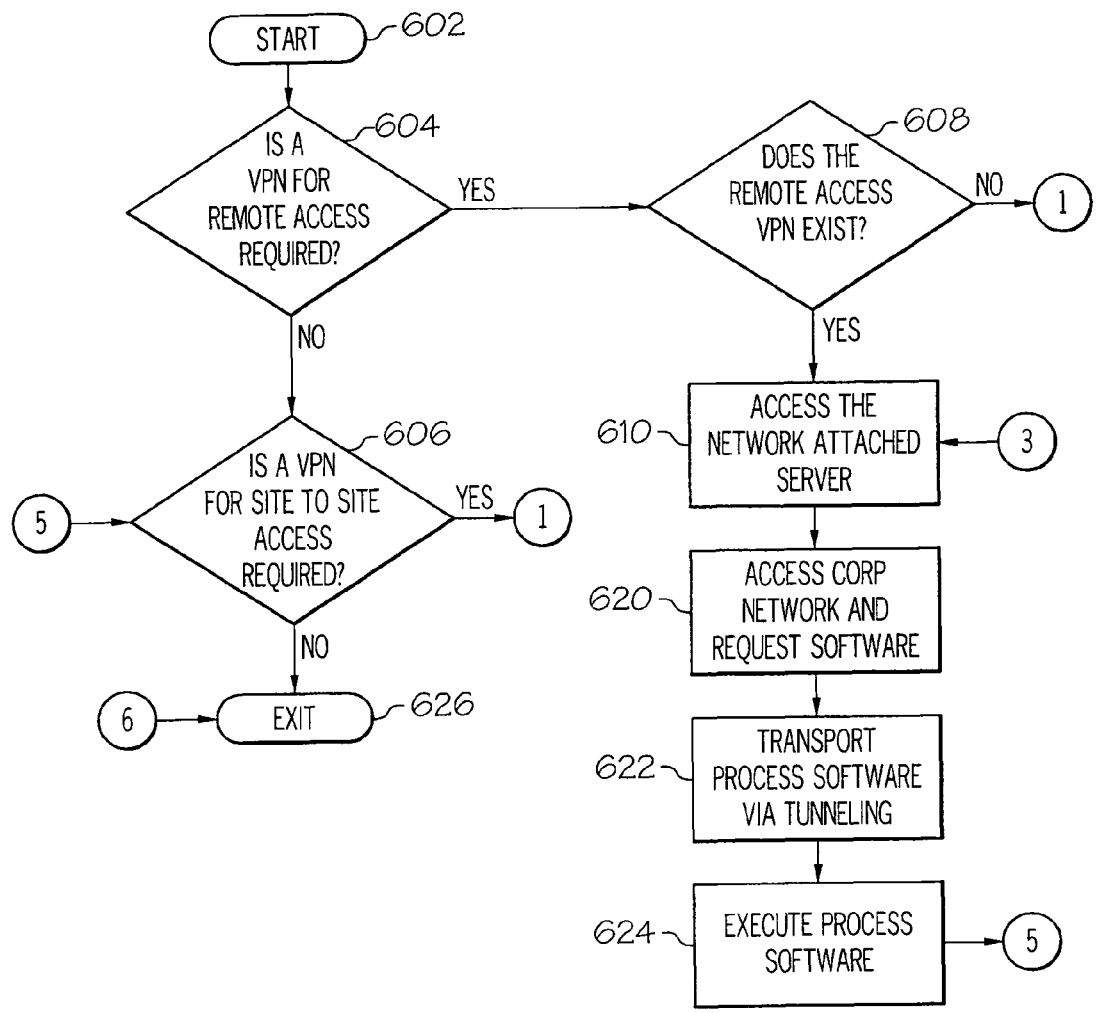
FIGS. 6a-c show a flow-chart of steps taken to deploy in a Virtual Private Network (VPN) software that is capable of executing the steps shown and described in FIGS. 2a-c.
Figure 6B:
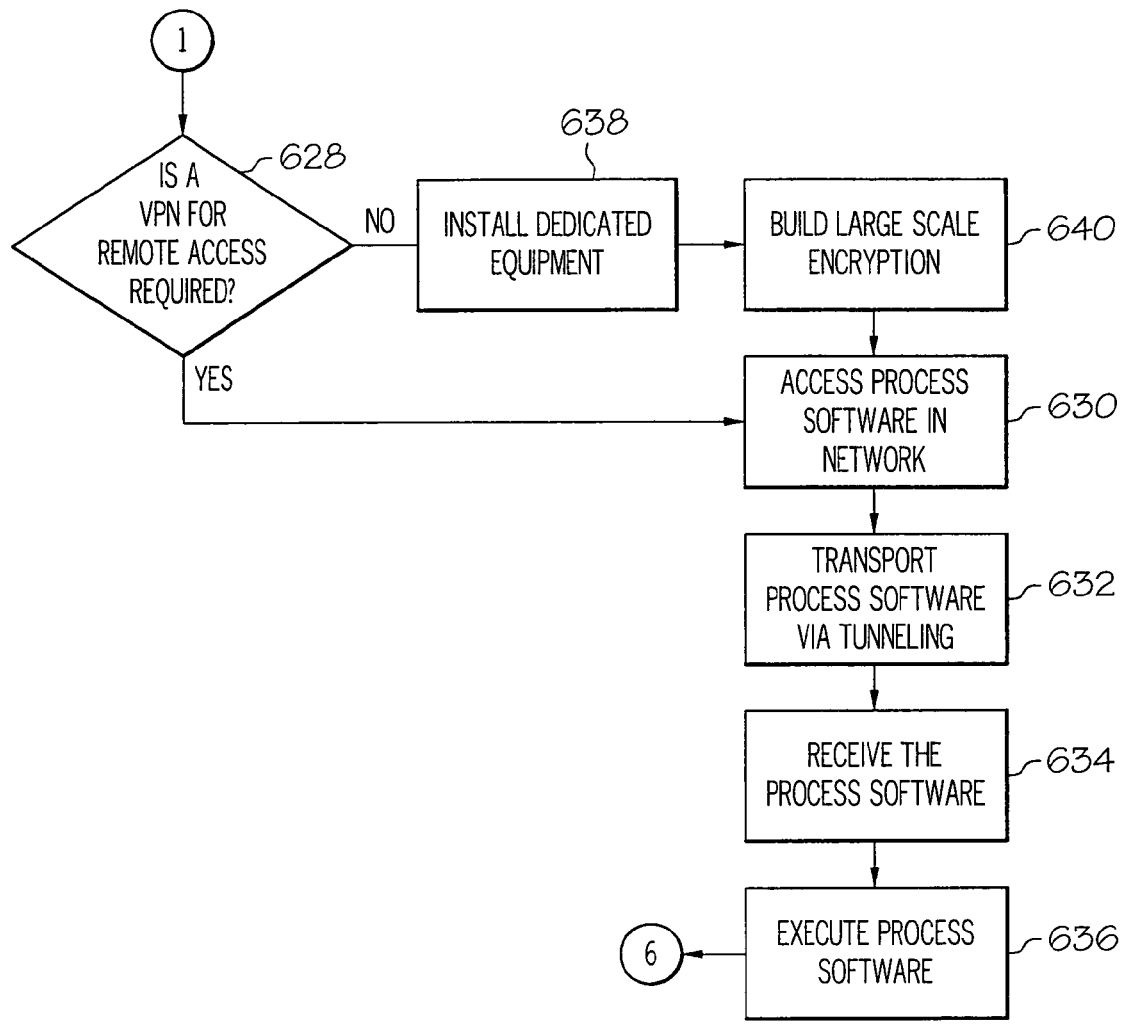
Figure 6C:
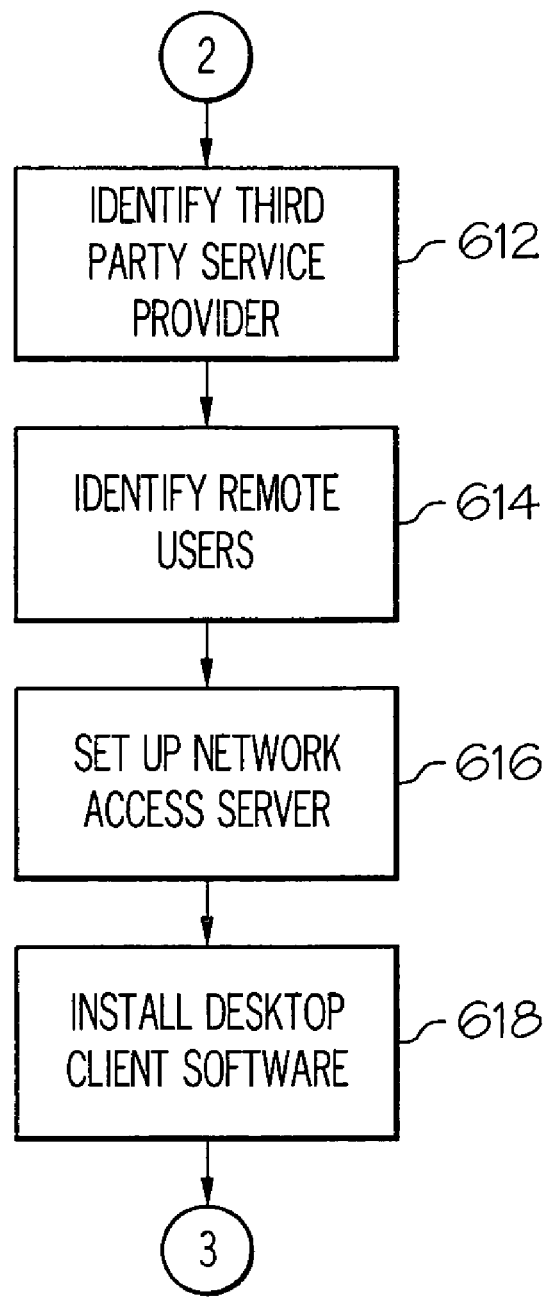

The process for such VPN deployment is described in FIG. 6. Initiator block 602 begins the Virtual Private Network (VPN) process. A determination is made to see if a VPN for remote access is required (query block 604). If it is not required, then proceed to (query block 606). If it is required, then determine if the remote access VPN exists (query block 608).

If a VPN does exist, then proceed to block 610. Otherwise identify a third party provider that will provide the secure, encrypted connections between the company's private network and the company's remote users (block 612). The company's remote users are identified (block 614). The third party provider then sets up a network access server (NAS) (block 616) that allows the remote users to dial a toll free number or attach directly via a broadband modem to access, download and install the desktop client software for the remote-access VPN (block 618).

After the remote access VPN has been built or if it been previously installed, the remote users can access the process software by dialing into the NAS or attaching directly via a cable or DSL modem into the NAS (block 610). This allows entry into the corporate network where the process software is accessed (block 620). The process software is transported to the remote user's desktop over the network via tunneling. That is the process software is divided into packets and each packet including the data and protocol is placed within another packet (block 622). When the process software arrives at the remote user's desk-top, it is removed from the packets, reconstituted and then is executed on the remote users desk-top (block 624).

A determination is then made to see if a VPN for site to site access is required (query block 606). If it is not required, then proceed to exit the process (terminator block 626). Otherwise, determine if the site to site VPN exists (query block 628). If it does exist, then proceed to block 630. Otherwise, install the dedicated equipment required to establish a site to site VPN (block 632). Then build the large scale encryption into the VPN (block 634).

After the site to site VPN has been built or if it had been previously established, the users access the process software via the VPN (block 630). The process software is transported to the site users over the network via tunneling (block 632). That is the process software is divided into packets and each packet including the data and protocol is placed within another packet (block 634). When the process software arrives at the remote user's desktop, it is removed from the packets, reconstituted and is executed on the site users desktop (block 636). The process then ends at terminator block 626.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7A:
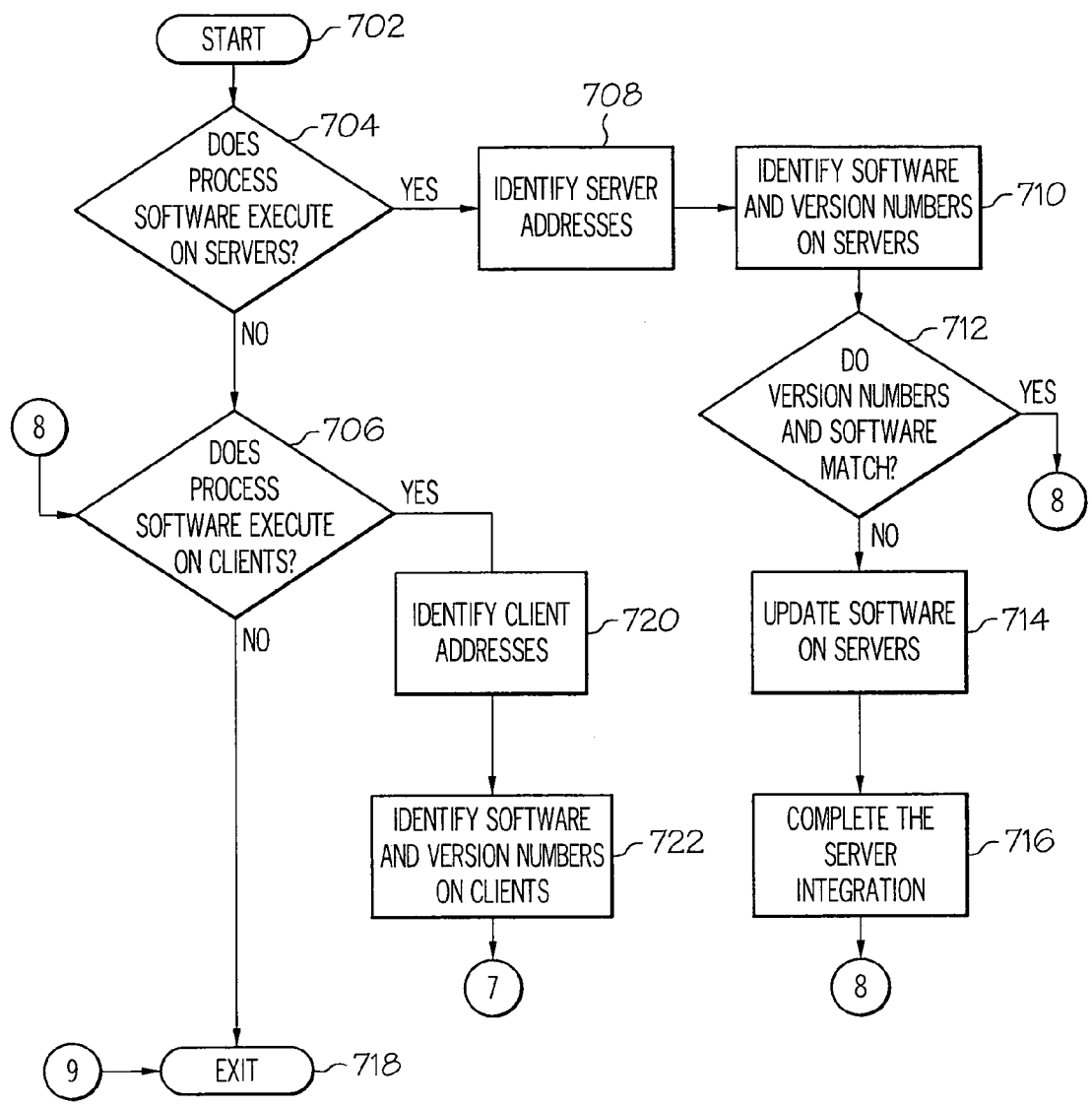
FIGS. 7a-b show a flow-chart showing steps taken to integrate into an computer system software that is capable of executing the steps shown and described in FIGS. 2a-c.
Figure 7B:
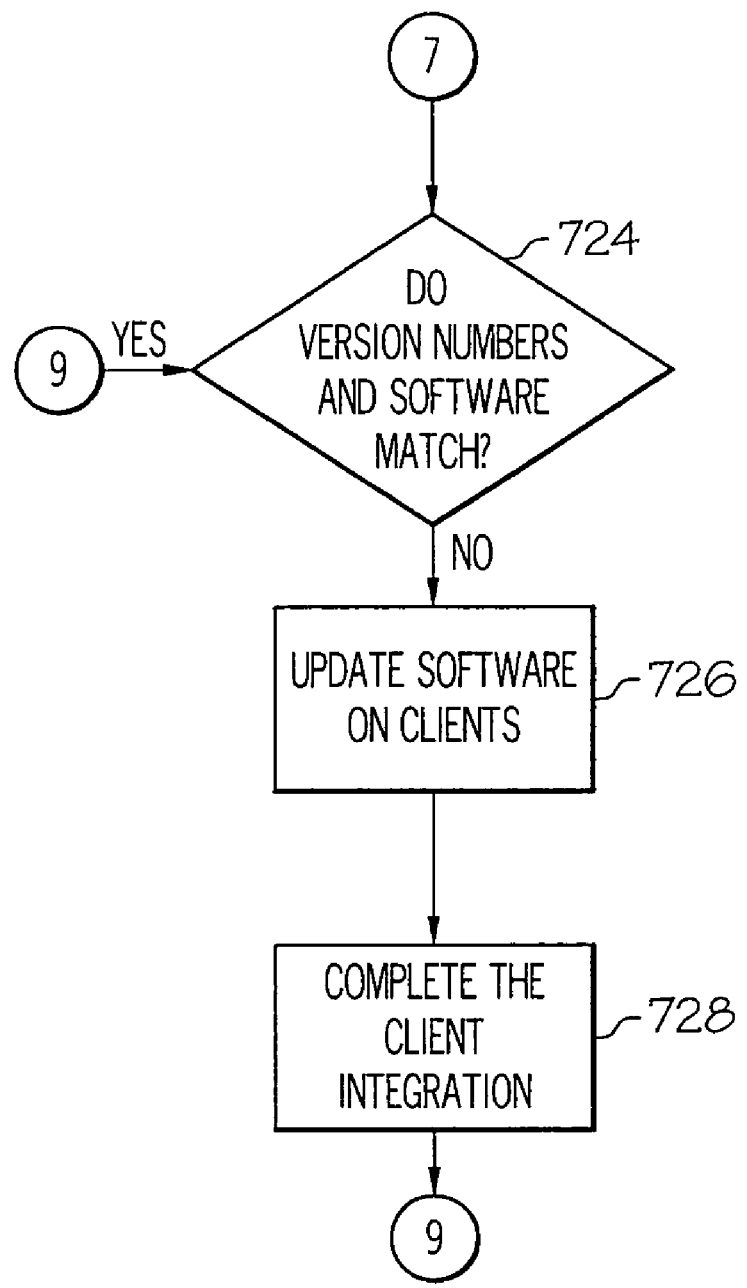

For a high-level description of this process, reference is now made to FIG. 7. Initiator block 702 begins the integration of the process software. The first tiling is to determine if there are any process software programs that will execute on a server or servers (block 704). If this is not the case, then integration proceeds to query block 706. If this is the case, then the server addresses are identified (block 708). The servers are checked to see if they contain software that includes the operating system (OS), applications, and network operating systems (NOS), together with their version numbers, which have been tested with the process software (block 710). The servers are also checked to determine if there is any missing software that is required by the process software in block 710.

A determination is made if the version numbers match the version numbers of OS, applications and NOS that have been tested with the process software (block 712). If all of the versions match and there is no missing required software the integration continues in query block 706.

If one or more of the version numbers do not match, then the unmatched versions are updated on the server or servers with the correct versions (block 714). Additionally, if there is missing required software, then it is updated on the server or servers in the step shown in block 714. The server integration is completed by installing the process software (block 716).

The step shown in query block 706, which follows either the steps shown in block 704, 712 or 716 determines if there are any programs of the process software that will execute on the clients. If no process software programs execute on the clients the integration proceeds to terminator block 718 and exits. If this not the case, then the client addresses are identified as shown in block 720.

The clients are checked to see if they contain software that includes the operating system (OS), applications, and network operating systems (NOS), together with their version numbers, which have been tested with the process software (block 722). The clients are also checked to determine if there is any missing software that is required by the process software in the step described by block 722.

A determination is made is the version numbers match the version numbers of OS, applications and NOS that have been tested with the process software (query block 724). If all of the versions match and there is no missing required software, then the integration proceeds to terminator block 718 and exits.

If one or more of the version numbers do not match, then the unmatched versions are updated on the clients with the correct versions (block 726). In addition, if there is missing required software then it is updated on the clients (also block 726). The client integration is completed by installing the process software on the clients (block 728). The integration proceeds to terminator block 718 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8A:
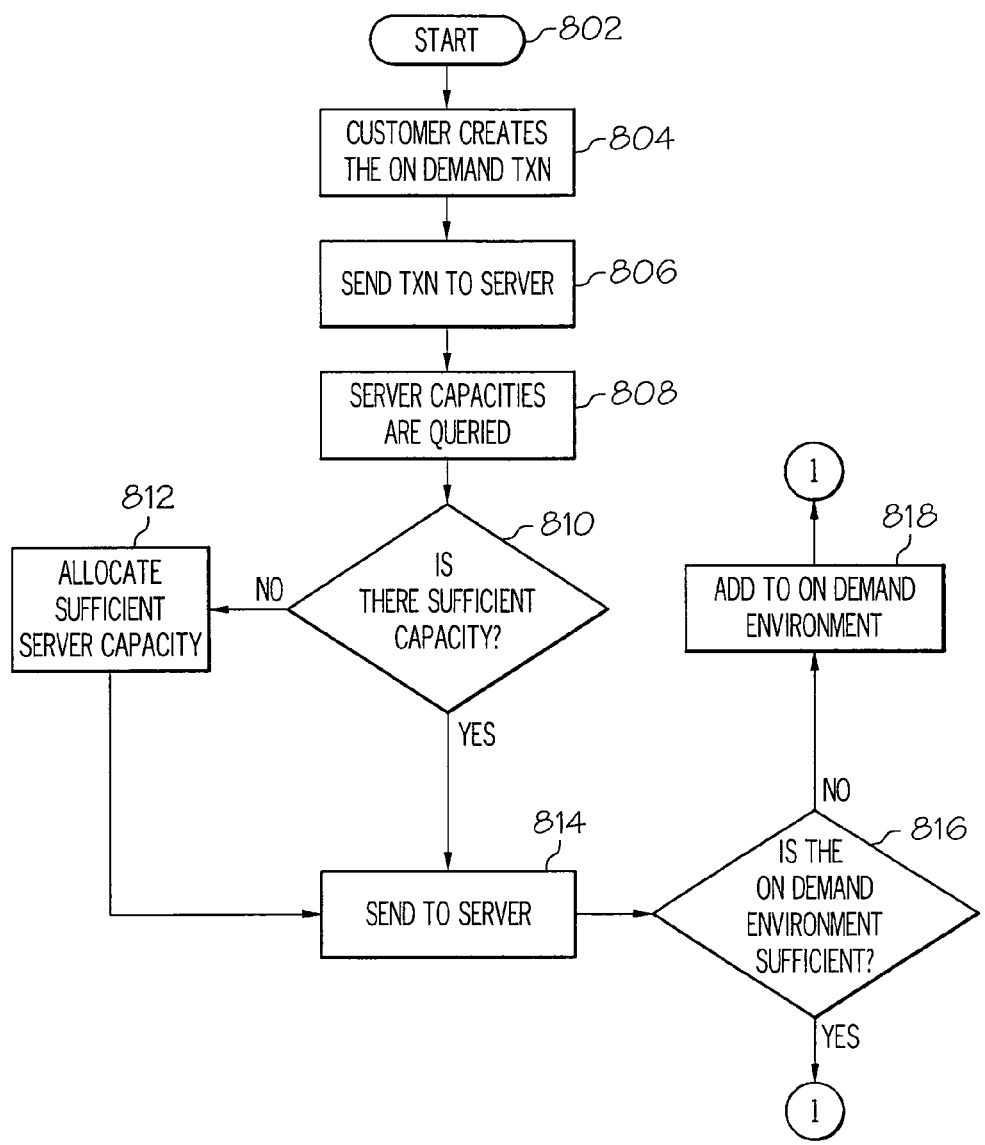
FIGS. 8a-b show a flow-chart showing steps taken to execute the steps shown and described in FIGS. 2a-c using an on-demand service provider.
Figure 8B:
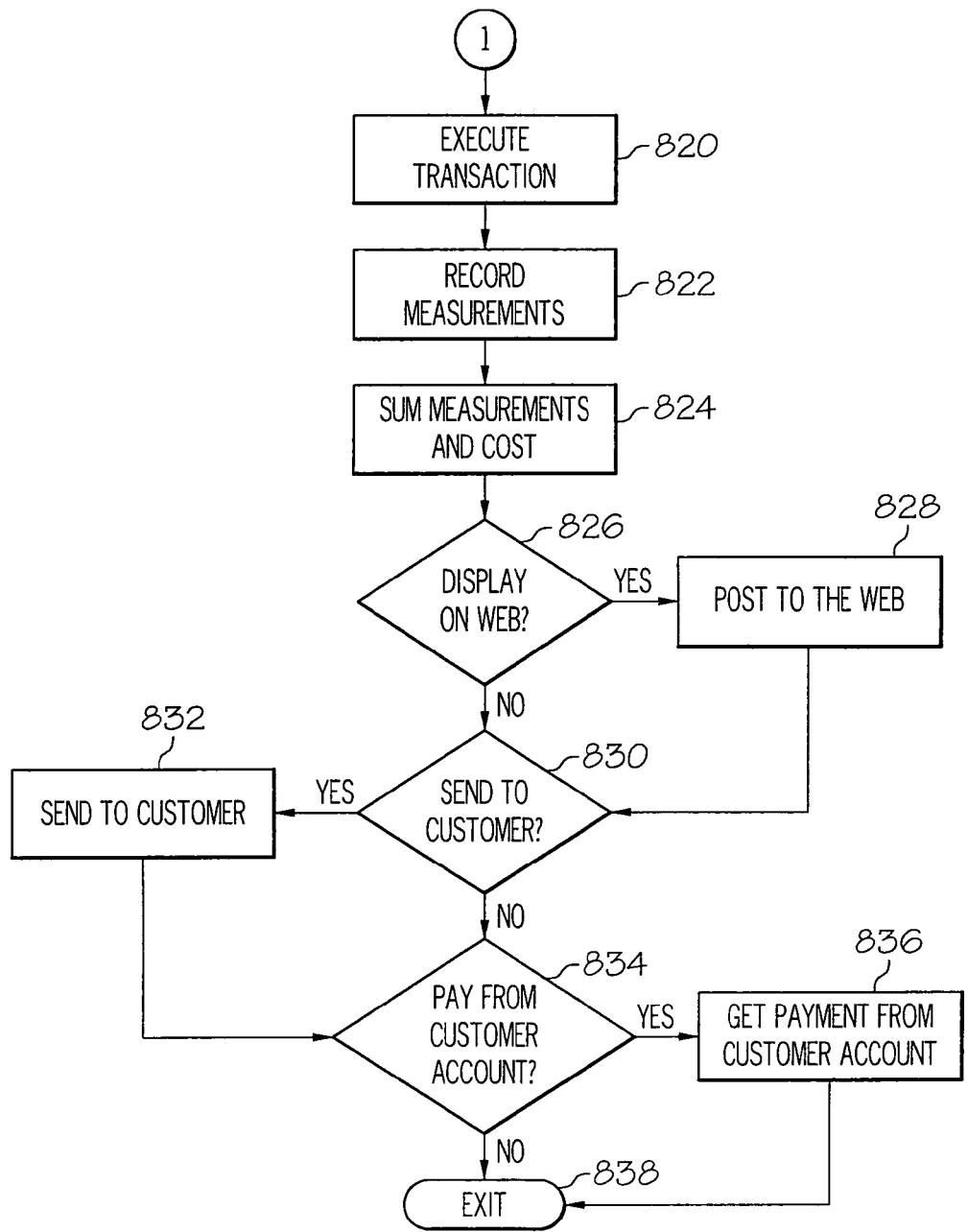

With reference now to FIG. 8, initiator block 802 begins the On Demand process. A transaction is created than contains the unique customer identification, the requested service type and any service parameters that further, specify the type of service (block 804). The transaction is then sent to the main server (block 806). In an On Demand environment the main server can initially be the only server, then as capacity is consumed other servers are added to the On Demand environment.

The server central processing unit (CPU) capacities in the On Demand environment are queried (block 808). The CPU requirement of the transaction is estimated, then the servers available CPU capacity in the On Demand environment are compared to the transaction CPU requirement to see if there is sufficient CPU available capacity in any server to process the transaction (query block 810). If there is not sufficient server CPU available capacity, then additional server CPU capacity is allocated to process the transaction (block 812). If there was already sufficient Available CPU capacity then the transaction is sent to a selected server (block 814).

Before executing the transaction, a check is made of the remaining On Demand environment to determine if the environment has sufficient available capacity for processing the transaction. This environment capacity consists of such things as but not limited to network bandwidth, processor memory, storage etc. (block 816). If there is not sufficient available capacity, then capacity will be added to the On Demand environment (block 818). Next the required software to process the transaction is accessed, loaded into memory, then the transaction is executed (block 820).

The usage measurements are recorded (block 822). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 824).

If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method for remapping child references when parent reference updates are processed, the method comprising:
    creating a List Of Values (LOV) update table, wherein said LOV update table stores parent LOV reference updates of an LOV parent table, and wherein said stored parent LOV reference updates need to be processed for remapping at least one child LOV reference;
    creating triggers to populate the LOV update table dynamically as the parent LOV reference updates occur;
    extracting child object LOV mapping definitions from a definition repository, wherein said child object LOV mapping definitions include child table information, child column information, an LOV type for each of said child table information and said child column information, and at least one parent LOV mapping column for remapping said at least one child LOV reference in response to at least one of said parent LOV reference updates indicated in said LOV update table;
    storing said extracted child object LOV mapping definitions into a control table in memory;
    in response to an update of said parent LOV references in the LOV parent table, capturing the parent LOV reference updates dynamically as said parent LOV reference updates occur and populating the parent LOV reference updates in the LOV update table via the created triggers;
    matching the extracted child object LOV mapping definitions with the parent LOV reference updates stored in said LOV update table; and
    in response to said matching, remapping said at least one child LOV reference of parent LOV data modified by the parent LOV reference updates using said extracted child object LOV mapping definitions.

2. The method of claim 1, wherein each trigger causes only one parent LOV reference update to populate the LOV update table.

3. A system comprising:
    a processor;
    a data bus coupled to the processor;
    a memory coupled to the data bus; and
    a computer-useable storage medium embodying computer program code, the computer program code comprising instructions executable by the processor and configured for:
    creating a List Of Values (LOV) update table, wherein said LOV update table stores parent LOV reference updates of an LOV parent table, and wherein said stored parent LOV reference updates need to be processed for remapping at least one child LOV reference;
    creating triggers to populate the LOV update table dynamically as the parent LOV reference updates occur;
    extracting child object LOV mapping definitions from a definition repository, wherein said child object LOV mapping definitions include child table information, child column information, an LOV type for each of said child table information and said child column information, and at least one parent LOV mapping column for remapping said at least one child LOV reference in response to at least one of said parent LOV reference updates indicated in said LOV update table;
    storing said extracted child object LOV mapping definitions into a control table in memory;
    in response to an update of said parent LOV references in the LOV parent table, capturing the parent LOV reference updates dynamically as said parent LOV reference updates occur and populating the parent LOV reference updates in the LOV update table via the created triggers;
    matching the extracted child object LOV mapping definitions with the parent LOV reference updates stored in said LOV update table; and
    in response to said matching, remapping said at least one child LOV reference of parent LOV data modified by the parent LOV reference updates using said extracted child object LOV mapping definitions.

4. The system of claim 3, wherein each trigger causes only one parent LOV reference update to populate the LOV update table.

5. A computer-useable storage medium embodying computer program code, the computer program code comprising computer executable instructions configured for:

creating a List Of Values (LOV) update table, wherein said LOV update table stores parent LOV reference updates of an LOV parent table, and wherein said stored parent LOV reference updates need to be processed for remapping at least one child LOV reference;

creating triggers to populate the LOV update table dynamically as the parent LOV reference updates occur;

extracting child object LOV mapping definitions from a definition repository, wherein said child object LOV mapping definitions include child table information, child column information, and LOV type for each of said child table information and said child column information, and at least one parent LOV mapping column for remapping said at least one child LOV reference in response to at least one of said parent LOV reference updates indicated in said LOV update table;

storing said extracted child object LOV mapping definitions into a control table in memory;

in response to an update of said parent LOV references in the LOV parent table, capturing the parent LOV reference updates dynamically as said parent LOV reference updates occur and populating the parent LOV reference updates in the LOV update table via the created triggers;

matching the extracted child object LOV mapping definitions with the parent LOV reference updates stored in said LOV update table; and in response to said matching, remapping said at least one child LOV reference of parent LOV data modified by the parent LOV reference updates using said extracted child object LOV mapping definitions.

6. The computer-useable storage medium of claim 5, wherein each trigger causes only one parent LOV reference update to populate the LOV update table.

7. The computer-useable storage medium of claim 5, wherein the computer program code is deployed to a client computer from a server at a remote location.

8. The computer-useable storage medium of claim 5, wherein the computer program code is provided by a service provider to a customer on an on-demand basis.

* * * * *